(12) United States Patent
Gupta et al.

(10) Patent No.: US 10,802,497 B2
(45) Date of Patent: Oct. 13, 2020

(54) AUTOMATED FAULT DIAGNOSIS AND RECOVERY OF MACHINES

(71) Applicant: GREY ORANGE PTE. LTD., Singapore (SG)

(72) Inventors: Akash Gupta, New Delhi (IN); Samay Kohli, New Delhi (IN); Wolfgang Kurt Hoeltgen, Laatzen (DE); Gaurav Kejriwal, Benares (IN)

(73) Assignee: GREY ORANGE PTE. LTD., Singapore (SG)

( * ) Notice: Subject to any disclaimer, the term of this patent is extended or adjusted under 35 U.S.C. 154(b) by 347 days.

(21) Appl. No.: 15/769,787

(22) PCT Filed: Oct. 24, 2016

(86) PCT No.: PCT/IB2016/001589
§ 371 (c)(1),
(2) Date: Apr. 20, 2018

(87) PCT Pub. No.: WO2017/068417
PCT Pub. Date: Apr. 27, 2017

(65) Prior Publication Data
US 2019/0265720 A1    Aug. 29, 2019

(30) Foreign Application Priority Data
Oct. 22, 2015    (SG) .................. 10201508740W (51) Int. Cl.
*G06F 17/00*    (2019.01)
*G05D 1/02*    (2020.01)
*G06T 7/80*    (2017.01)
*G06T 7/73*    (2017.01)
*G06T 7/77*    (2017.01)

(52) U.S. Cl.
CPC ......... *G05D 1/0236* (2013.01); *G05D 1/0234* (2013.01); *G05D 1/0248* (2013.01);
(Continued)

(58) Field of Classification Search
CPC .. G05D 1/0236; G05D 1/0234; G05D 1/0248; G05D 2201/0216; G06T 7/80;
(Continued)

(56) References Cited

U.S. PATENT DOCUMENTS 4,790,402 A * 12/1988 Field ................... G05D 1/0238
                                                    180/169
5,923,139 A    7/1999 Colgate et al.
(Continued)

FOREIGN PATENT DOCUMENTS

WO    WO 2006/065563 A2    6/2006

OTHER PUBLICATIONS

International Search Report and Written Opinion dated May 22, 2017 in PCT/IB2016/001589 filed Oct. 24, 2016.
(Continued)

*Primary Examiner* — Ronnie M Mancho
(74) *Attorney, Agent, or Firm* — Oblon, McClelland, Maier & Neustadt, L.L.P.

(57) ABSTRACT

A system and method for diagnosing and recovering from faults in a robot includes providing markers affixed to a floor surface, where each marker has a positional indicia thereon, navigating an area by the robot using the markers, acquiring the positional indicia on at least one marker, processing the acquired positional indicia to determine a position and angle of the at least one marker, computing a position offset and angle offset of markers with respect to a reference position and angle, adjusting the reference position and angle when the computed position offset and angle offset meets a first predetermined criteria, and alerting an external entity when the computed position offset and angle offset does not meet the first predetermined criteria.

16 Claims, 5 Drawing Sheets

(52) U.S. Cl.
CPC ............... *G06T 7/73* (2017.01); *G06T 7/74* (2017.01); *G06T 7/77* (2017.01); *G06T 7/80* (2017.01); *G05D 2201/0216* (2013.01); *G06T 2207/10016* (2013.01); *G06T 2207/30208* (2013.01); *G06T 2207/30252* (2013.01); *G06T 2207/30256* (2013.01)

(58) Field of Classification Search
CPC .... G06T 7/74; G06T 7/73; G06T 7/77; G06T 2207/10016; G06T 2207/30208; G06T 2207/30252; G06T 2207/30256
USPC ........................................................ 700/250
See application file for complete search history.

(56) References Cited

U.S. PATENT DOCUMENTS

| | | | |
|---|---|---|---|
| 7,708,493 B2* | 5/2010 | Jung | G09F 9/30 116/63 R |
| 9,157,757 B1 | 10/2015 | Liao et al. | |
| 2002/0156556 A1* | 10/2002 | Ruffner | G01S 5/02 701/23 |
| 2011/0125323 A1* | 5/2011 | Gutmann | G05D 1/0274 700/258 |
| 2012/0116584 A1 | 5/2012 | Kim et al. | |
| 2012/0152877 A1* | 6/2012 | Tadayon | B25J 5/00 212/224 |
| 2012/0239224 A1 | 9/2012 | McCabe et al. | |
| 2013/0138246 A1* | 5/2013 | Gutmann | G05D 1/0274 700/253 |
| 2015/0332213 A1* | 11/2015 | Galluzzo | B25J 15/0085 700/216 |
| 2017/0249745 A1* | 8/2017 | Fiala | G06T 7/277 |
| 2019/0265720 A1* | 8/2019 | Gupta | G05D 1/0236 |

OTHER PUBLICATIONS

Extended European Search Report dated May 17, 2019 in corresponding European Patent Application No. 16856987.9, 7 pages.

* cited by examiner

FIG. 5

AUTOMATED FAULT DIAGNOSIS AND RECOVERY OF MACHINES

CROSS-REFERENCES TO RELATED APPLICATIONS

The present application claims the benefit of Singapore Provisional Application No. 10201508740W filed on Oct. 22, 2015, the entire disclosure of which is hereby incorporated by reference.

TECHNICAL FIELD

The field of the present disclosure pertains to automated fault diagnosis of machines.

DESCRIPTION OF THE RELATED ART

Machines such as moving robots (also known as Automated Guided Vehicles, Automatic Guided Vehicles or AGVs) can be used to move materials and other goods in warehouses, distribution centers, and factories. However, the machines may occasionally require adjustment, calibration, or maintenance. Traditionally, by the time a fault can be noticed and corrected, the machine may have undergone severe damage. Therefore, there is a need to diagnose fault conditions in machines within a reasonable amount of time such that its diagnosis can manifest to a repair at the right moment.

SUMMARY

A method for diagnosing and recovering from faults in a robot is disclosed. The method includes providing a number of markers affixed to a floor surface, each marker having a positional indicia thereon and each marker having a position and angle, navigating from a first marker to a second marker using a stored position offset and/or angle offset of the second marker and a position and angle of the first marker relative to the robot, acquiring the positional indicia on the second marker, processing the acquired positional indicia to determine a position and angle of the second marker, computing a position offset and angle offset of the second marker with respect to the position and angle of the first marker, adjusting the stored position offset and angle offset of the second marker when the computed position offset and angle offset of the second marker meets a first predetermined criteria, and alerting an external entity when the computed position offset and angle offset of the second marker does not meet the first predetermined criteria.

A system for diagnosing and recovering from faults is also disclosed. The system includes a number of markers affixed to a floor surface, each marker having a positional indicia thereon and each marker having a reference position and angle, one or more robots, wherein each robot includes circuitry configured to: navigate from a first marker of the to a second marker using a stored position offset and/or angle offset of the second marker and a position and angle of the first marker relative to the robot, acquire the positional indicia on the second marker, process the acquired positional indicia to determine a position and angle of the second marker, compute a position offset and angle offset of the second marker with respect to the position and angle of the first marker, adjust the stored position offset and angle offset of the second marker when the computed position offset and angle offset of the second marker meets a first predetermined criteria, and alert an external entity when the computed position offset and angle offset of the second marker does not meet the first predetermined criteria.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following discussion provides a brief, general description of a suitable environment in which various embodiments of the present disclosure can be implemented. The embodiments can be embodied in a special purpose computer or data processor that is specifically programmed, configured, or constructed to perform one or more of the computer executable mechanisms explained in detail below.

Exemplary embodiments now will be described with reference to the accompanying drawings. The disclosure may, however, be embodied in many different form and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or"

includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some structural elements and functional entities, all being logical units whose implementation may differ from what is shown. The connections shown are logical connections; the actual physical connections may be different. It is apparent to a person skilled in the art that the structure may also comprise other functions and structures. It should be appreciated that the functions, structures, elements and the protocols used in communication are irrelevant to the present disclosure. Therefore, they need not be discussed in more detail here.

In addition, all logical units described and depicted in the figures may include software and/or hardware components required for the unit to function. Further, each unit may comprise within itself one or more components, which are implicitly understood. These components may be operatively coupled to each other and be configured to communicate with each other to perform the function of the said unit.

Machines, such as moving robots, may be used to move materials and other products within designated areas of a warehouse, distribution center, factory, or other facility. Such machines may also move entire shelving racks or Mobile Storage Units (MSUs) to improve the efficiency of product storage and retrieval in a warehouse or product distribution center. Moving robots may be configured to move along a floor based on a predetermined map of a designated area and using dead reckoning (calculating a position by estimating the direction and distance traveled) to navigate under and around equipment, fixtures, MSUs, and obstacles. Such machines may use wheel revolutions (from wheel encoders, for example) to compute direction and distance from a known initial starting position (this kind of dead reckoning process is also known as "odometry").

But dead reckoning navigation systems may be subject to significant cumulative errors due to discrepancies between estimated and actual distance travelled. These discrepancies may occur due to wheel slippage, mechanical degradation, floor surface anomalies, and the like. Dead reckoning navigation systems can be improved significantly by the use of occasional or periodic absolute position markers (sometimes referred to as artificial landmarks).

Referring now to the drawings, wherein like reference numerals designate identical or corresponding parts throughout the several views.

Figure 1:
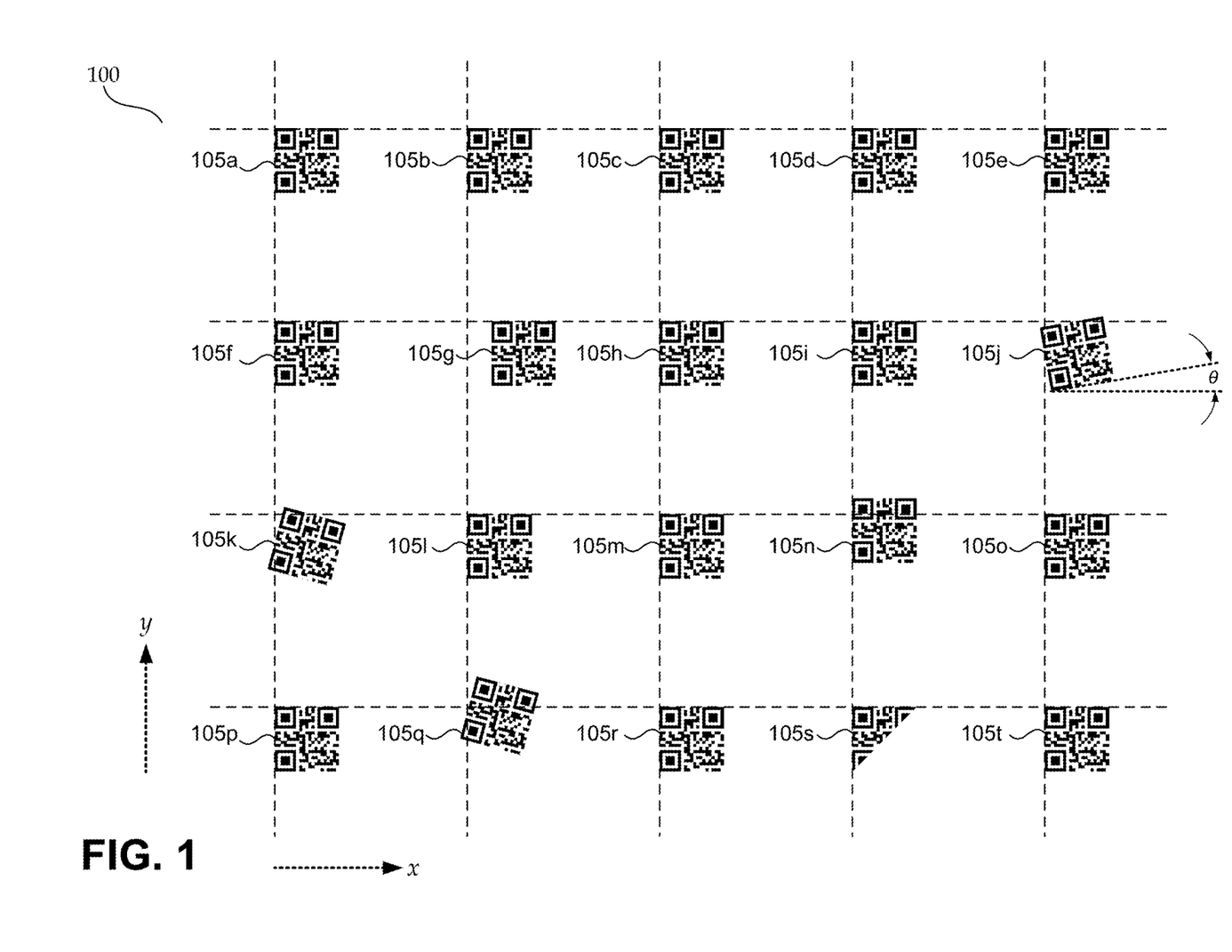
FIG. 1 illustrates an arrangement of markers according to some implementations of the present disclosure.

FIG. 1 illustrates an implementation where, for example, an arrangement of markers 105a-105t, each having imprinted positional indicia such as bar codes (1D or 2D) or other patterns, may be affixed to a floor 100 over which one or more machines may navigate. Each of the markers may be constructed to allow the sensing of a precise position and angle of the marker. In some embodiments, for example, the positional indicia may be a QR code (Quick Response Code), Data Matrix code, or Aztec Code. In FIG. 1, the grid of dashed lines, the axis markings (x and y), and the angle markings are shown for reference only and do not represent actual floor markings. Markers 105a-105t may be placed manually by a person, or by a machine, using laser guidance or other similar methods. But in practice, marker positions may not be precise. For example, markers 105g and 105n may have small positioning offsets with respect to other markers, and markers 105j and 105k may have small angular offsets with respect to other markers. A marker 105q may have both position offset and angular offset. Moreover, some markers (for example, 105s) may be (or become) damaged and some may be missing entirely. The arrangement, size, shape, form and spacing of the markers illustrated in FIG. 1 is not intended to be limiting. Those skilled in the art will recognize that many other arrangements, sizes, shapes, forms, and spacing of the markers may be employed to accomplish the goals of the present disclosure. Additionally, the markers may all be identical (each having an identical Data Matrix code or QR code, for example), or each marker may have a unique code.

In some embodiments, each machine may incorporate one or more sensors (cameras, laser scanners or other imaging systems) and image processing circuitry to acquire (read) the positional indicia on a marker as the machine approaches or rolls over it. Each time a machine acquires a marker's positional indicia, it may use the information to correct or compensate for marker placement errors and adjust its path planning (distance and heading, for example) based on the precise position and orientation of a marker.

Machines, in some embodiments, may navigate by incrementally planning travel from one marker to the nearest marker in the direction of desired travel. For example, with reference to FIG. 1, if a machine begins at marker 105a and is required to travel to marker 105h, it may first travel from marker 105a to marker 105b, then from marker 105b to marker 105c. Finally, the machine may travel from marker 105c to marker 105h. Although a machine need not stop at each intervening marker, (markers 105b and 105c, in this example), the machine may acquire the positional indicia on a marker as it passes over or near it, and use this information to make adjustments in navigation to the next marker.

To facilitate this type of incremental navigation, in some embodiments, a marker offset table may be employed. A marker offset table may contain, for example, position and/or angle offsets (deviations) that help a machine navigate from each marker (origin) to each of its nearest neighbors (destinations). So, for example, with reference to FIG. 1, the marker offset table may contain an entry for each of the markers 105a-105t as origins, along with information necessary for the machine to navigate to each of the its nearest neighbors (e.g., 4 neighbors in one embodiment) as destinations. An entry, for example, for origin marker 105h may include information necessary for a machine to navigate to destination markers 105c, 105g, 105i, and 105m. The marker offset values stored in each entry in the marker offset table may be specified as the position and/or angle offset required to be added to the angle and/or position of the origin marker (as acquired and decoded by the machine) such that, ideally, the machine reaches the destination marker with no position deviation. In other embodiments, the marker offset table may contain additional information. For example, the marker offset table may contain the information necessary for a machine to navigate to each of its eight nearest neighbors (including diagonals) as destinations.

Figure 2:
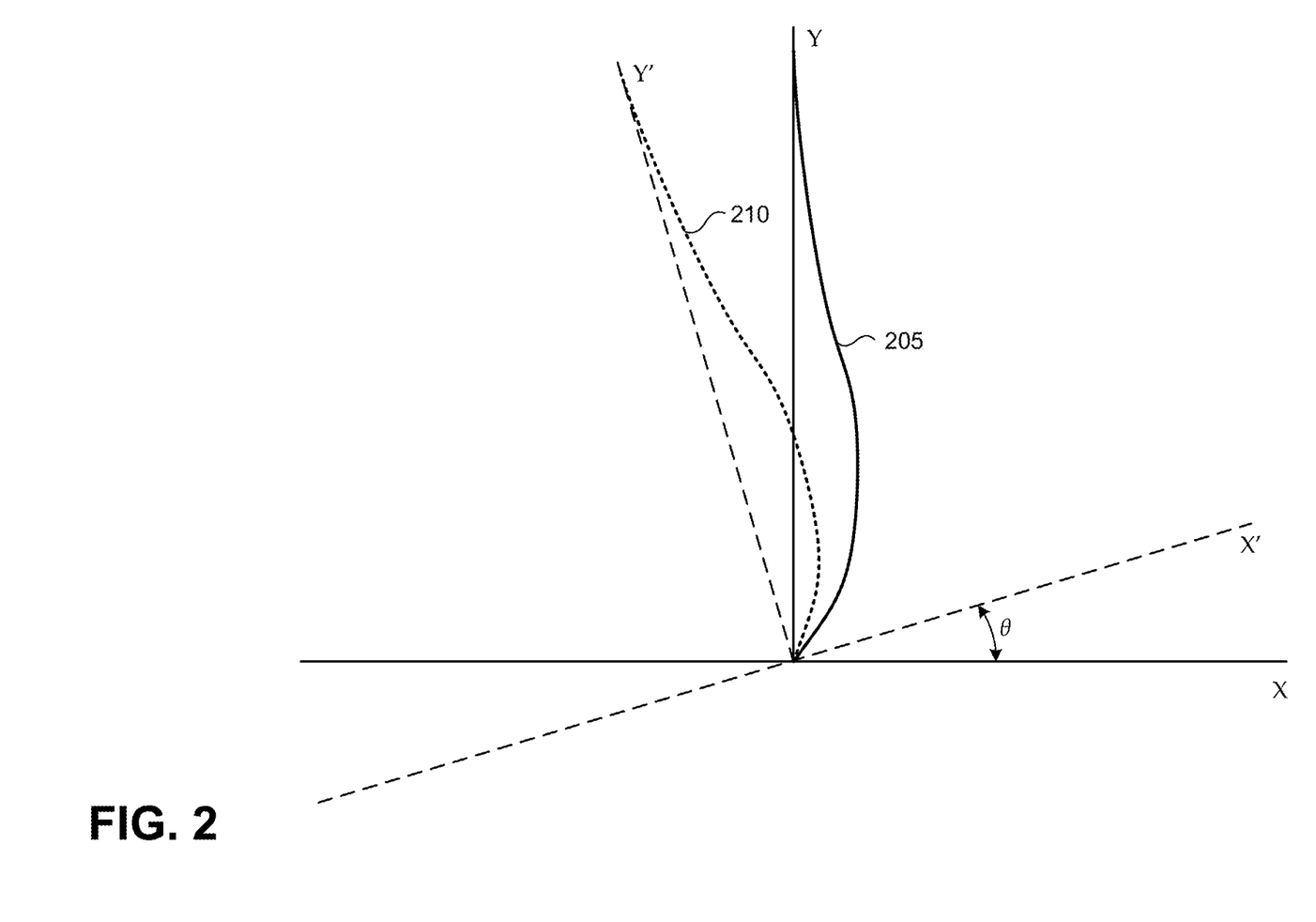
FIG. 2 illustrates navigation paths for a machine according to some implementations of the present disclosure.

FIG. 2 illustrates navigation paths for a machine according to some implementations. If a marker offset to a destination has an angle θ, a machine may plan a normal path 205 in a normal frame, shown in FIG. 2 as defined by axes X and Y. But the machine may actually travel a modified path 210 in a rotated frame defined by axes X' and Y' based on the angle offset from the origin marker to the destination marker.

In some embodiments, one or more machines may be guided over the floor area, where an arrangement of markers has been placed, to create/calibrate an initial marker offset table of the emplaced markers, including, for example, an angle offset, and optional movement direction, of each marker that would allow the machine to reach another marker. The initial marker offset table may include a precise position offset for one or more of the pairs of markers in other embodiments. In some embodiments, the machines used for establishing this initial marker offset table may be reference machines. Each reference machine may be known to have an accurate dead reckoning (odometry) system, or, in some embodiments may be equipped with an additional absolute positioning system (that may not be incorporated, for example, into a typical machine).

In one embodiment, the reference machine may be selected by running a plurality of machines over a strip of markers that are affixed with the same error tolerance as in a real world operating environment (a warehouse, for example). The machines may be run several times in both a front face (Face 1) movement and a back face (Face 2) movement. If there is no difference in the motion of the two wheels of the machine, then in both faces (i.e., Face 1 and Face 2) the machine should behave/deviate in the same side, or should not deviate at all (e.g., for any reason due to mechanical hardware). A value of marker calibration offsets is calculated for each marker using the data separately for the Face 1 movement and the Face 2 movement. The machine(s) for which the values match very closely (e.g., difference between calibration offsets for Face 1 and Face 2 movements is/are smallest) may be selected as a reference machine, In some embodiments, machines may be guided between markers multiple times to improve calibration accuracy. For example, a machine may be guided between pairs of markers from 10 to 100 times to improve calibration accuracy. In some implementations, a machine may initially take 10 trips between an origin marker and a destination marker, each time acquiring the positional indicia at the destination marker and computing (by the machine or server) the required position and/or angle offset. A calculation may be made of the mean and standard deviation for the results of these 10 samples. An additional 10 trips may then be made, with a similar calculation of the mean and standard deviation for the results of all of the 20 samples cumulatively. This process may be repeated, adding 10 trips each time. After a particular sample size, the change in mean and standard deviation may drop below a predetermined threshold. This may be judged to be the optimal sample size (N). To calculate the final position offset and/or angle offset values, the mean and standard deviation for the N samples may be calculated. All values outside the range of plus or minus one standard deviation may be removed.

In some embodiments, before beginning normal operation, machines may store their own marker offset table based, initially, on a reference table created during the calibration process discussed above. In other embodiments, a machine's marker offset table may be stored on a server. During normal operation, each machine may use its one or more sensors and image processing circuitry to acquire positional indicia from markers as the machine approaches or rolls over them. As discussed above, a machine may adjust its path planning (distance and heading, for example) based on the precise position and orientation of an acquired marker and the offset (in the offset marker table) to a destination marker.

A machine, or server, may also use the acquired position and orientation of a marker to diagnose and recover from fault conditions. Fault conditions may be external to the machine (a missing or misplaced marker or an unreadable positional indicia on a marker, for example), or may be internal. Internal faults may include, but are not limited to, non-systematic errors such as a worn or otherwise damaged wheel, mechanical degradation (wear and tear) or failure, electronic failure, loss of calibration, degradation of motor performance, etc.; and systematic errors such as sensor (e.g., camera) alignment errors and malfunctions, differences in wheel diameter, variation in wheel base dimension, wheel alignment, and the like. Further, predictions can be made as to floor undulations to some extent based on the acquired data.

Under some circumstances, a machine may determine that one or more markers may be missing or misplaced. In other situations, for example when all markers are showing an offset error, it may be determined that a machine's positioning system may be at fault. In some cases, a machine may be able to make corrections or adjustments to its positioning system or adjust its drive system (turn one wheel faster than another wheel to account for reduced circumference due to wear, for example). In other situations, a machine may produce an alert to an external entity (a server, for example) to indicate that a fault or uncorrectable error has occurred.

In some embodiments, a central server may, from time to time, analyze the marker tables from all machines operating in the same area. For example, a statistical analysis may be used to determine if a malfunction is present in a machine, or may indicate other systemic problems, such as unreadable or misplaced markers. In one example, a distribution enter may have an area with M markers, on which N machines have been operating. Each of the N machines may upload, to a server, deviation values (position and/or angle errors) for each of the M markers as the machine acquires the positional indicia on the markers. If, for example, the deviation values on some markers have very high standard deviation or there are a large number of outliers and these values are distributed across different machines, then it may be assumed that there is a problem with the floor at those points. Alternatively, if one specific machine has very high standard deviation for most of the markers where other machines are showing consistent behavior, then it may be concluded that the machine has a problem or fault. Overall, the collection of data (deviation values) over time for different machine on different markers, may allow data analysis to uncover other hidden or new faults affecting accurate navigation. It may also be possible to compensate/correct for wear and tear occurring due to ageing.

Figure 3:
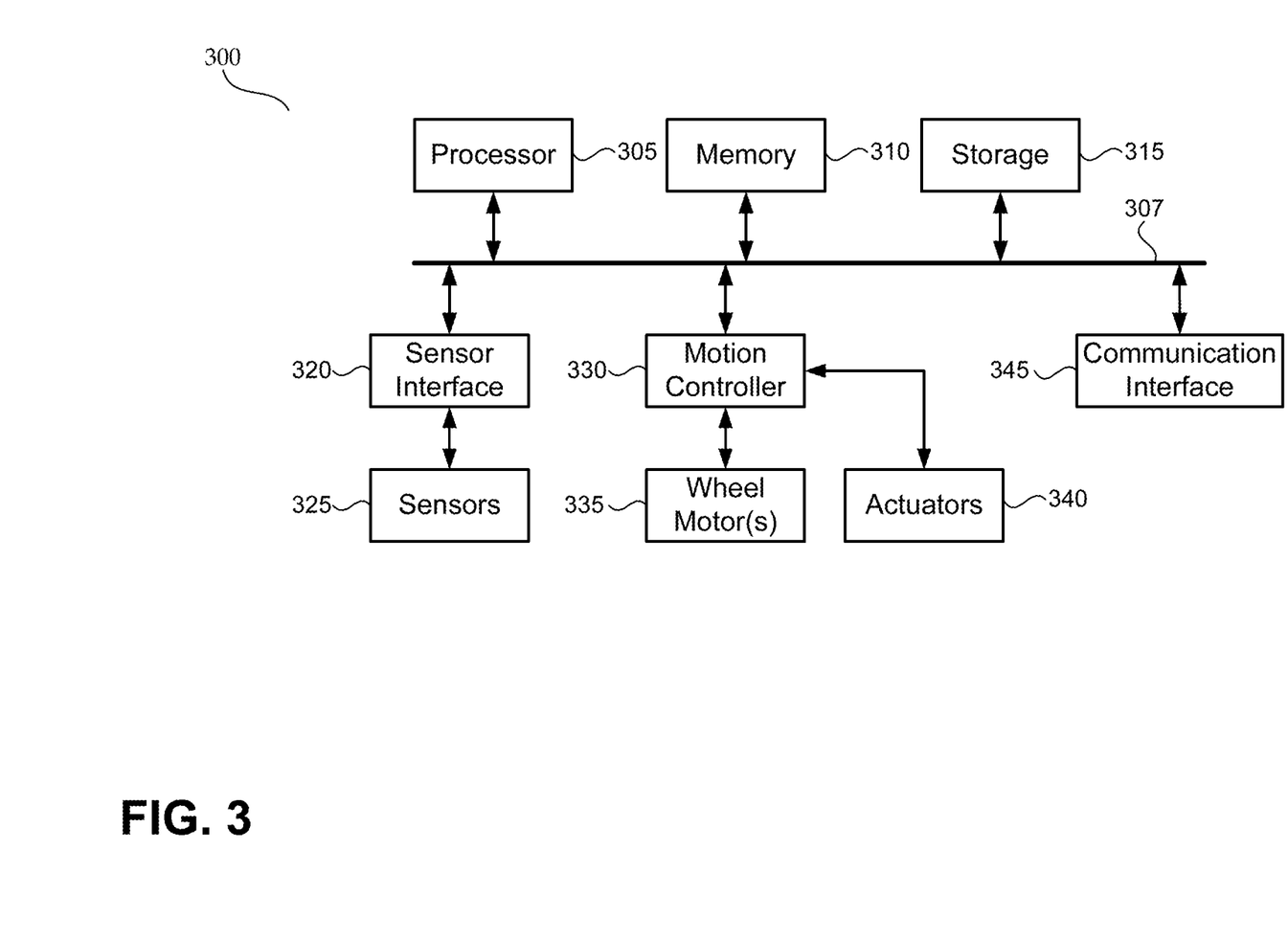
FIG. 3 illustrates a simplified functional block diagram of the electronic and electro-mechanical components of a machine according to some embodiments of the present disclosure.

FIG. 3 illustrates a simplified functional block diagram of the electronic and electro-mechanical components of a machine according to some embodiments of the present disclosure. Machine 300 may include at least one processor 305. Processor 305 may be a standard (off-the-shelf) single core or multi-core microprocessor, such as a Core™, Xeon®, Atom™, or Pentium®, available from Intel® or an FX™, Athlon™, or Sempron™ available from AMD, or may be a single or multi-core embedded processor such as an ARM®Cortex® or other embedded ARM® processor. In some embodiments, processor 305 may be a proprietary, custom designed, or application-specific integrated circuit (ASIC). Bus 307 may be used to connect processor 305 to various other components within machine 300. Memory 310 may be a non-transitory storage device, such as high-speed Random Access Memory (RAM) for use by processor 305 for the storage of program code (to be executed by processor 305) and data. Storage 315 may be a non-volatile, non-transitory storage device, such as a hard disk drive, solid state drive, or Flash memory device. Storage 315 may typically be higher capacity, but slower speed than memory 310 and be used as mass storage to store program code and data to be used by processor 305. During normal operation, program code and data may be transferred from storage 315 to memory 310 before being executed from memory 310 by processor 305. In some embodiments, bus 307 may include multiple buses. For example, bus 307 may include a high-speed bus for connection between processor 305 and high-speed components (such as memory 310), and a low-speed bus for connection between processor 305 and low-speed components.

Sensor interface 320 may be used to connect various sensors 325 to processor 305. Sensors 325 may include, but are not limited to, cameras, laser scanners or imaging systems, acoustic ranging devices, wheel rotation sensors (sometimes called rotary encoders or shaft encoders), gyro sensors, accelerometers, RF sensors, and temperature sensors. Sensor interface 320 may include circuitry configured to convert a raw sensor input to a digital format (Analog-to-Digital converters, for example) and may also include processing circuitry to provide specific functionality related to particular sensors. For example, image processing circuitry may be incorporated into sensor interface 320 to identify markers from image input from sensors 325 (cameras and/or laser scanners, for example). Motion controller 130 may be used to connect one or more wheel motors 335 and actuators 340 to processor 305. Machine 300 may include two or more wheels, where at least one wheel may be driven by one or more wheel motors 335 to move machine 300. Machine 300 may have a specific steering mechanism that turns one or more wheels, or may accomplish a steering function by varying the speed relationship between or among the two or more wheels. Machine 300 may also include one or more actuators 340. Actuators 340 may include, but are not limited to, a steering mechanism to steer machine 300; a lifting mechanism to lift materials, products, Mobile Storage Units and the like; and a robotic arm to pick, place or otherwise move materials, products, packages, and the like.

Communication interface 345 provides a wireless communication link between machine 300 and a stationary entity (computer, server, PC, etc.). Communication interface 345 may use one of the IEEE 802.11 standard wireless local area network protocols (also called WiFi), a cellular data network (3G, 4G, LTE, etc.), or a proprietary wireless communication system.

Machine 300 may also include batteries, battery chargers, lighting elements, and other ancillary components.

Figure 4:
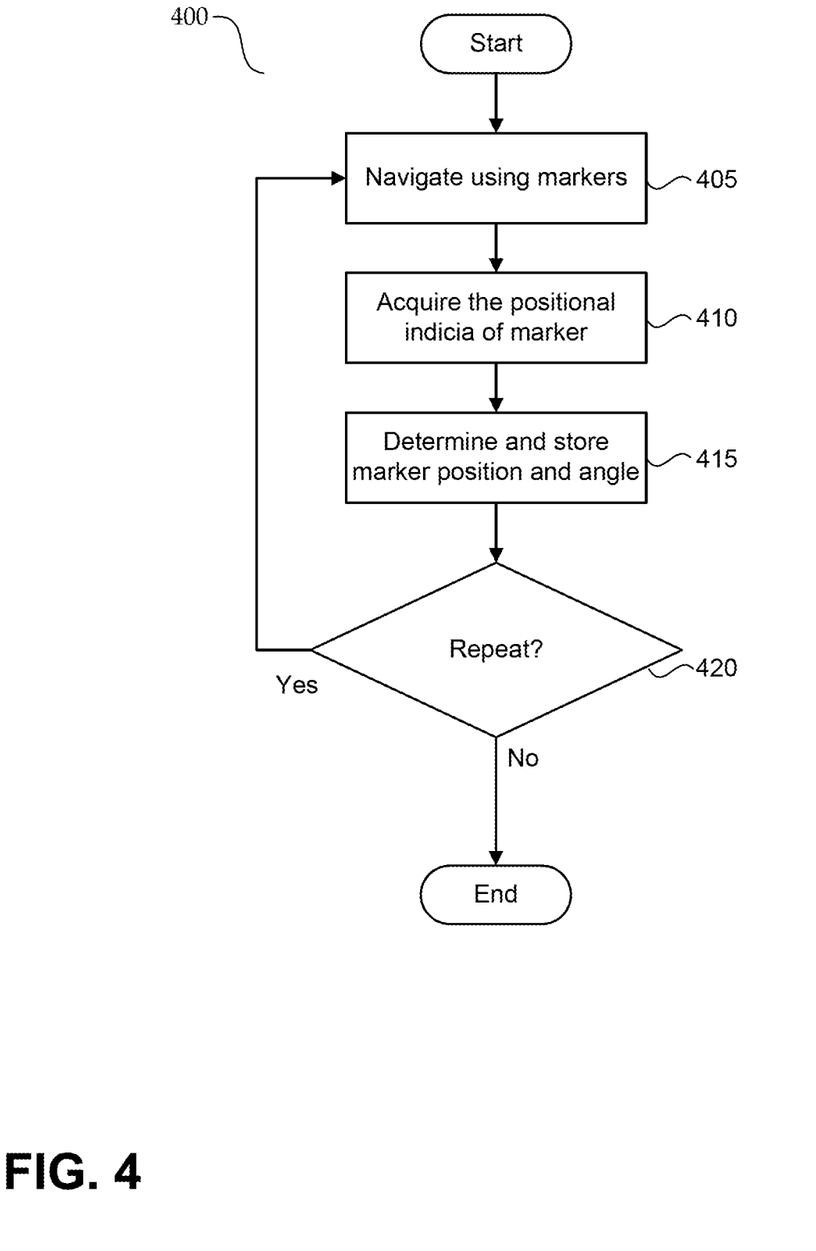
FIG. 4 illustrates a flow diagram representation of a method for automated fault diagnosis of machines according to some implementations of the present disclosure.

FIG. 4 illustrates a flow diagram of an example automated fault diagnosis process 400 according to some embodiments of the present disclosure. FIG. 4 illustrates the use of a navigation technique that may allow for the determination of performance levels and faults in a machine. As discussed above, some embodiments of the present disclosure may use markers placed on the floor of a warehouse, distribution center, or factory. Machines may use positional indicia on the markers to track their position and navigate. The data collected by each machine during navigation may also be used to monitor the navigation performance and detect faults.

In step 405 of automated fault diagnosis process 400, machine 300 may navigate from an origin marker to a destination marker. Machine 300 may use entries in a marker offset table, including, but not limited to, a stored position offset and/or angle offset to be used in its navigation plan for travel to the destination marker. For example, the machine may determine its position offset and/or angle offset relative to the origin marker using, for example, a camera and image processing circuitry. The machine or server may calculate a path to the destination marker based on the determined position offset and/or angle offset and the entry in the marker offset table for the origin marker and destination marker pair.

In step 410, machine 300, having arrived at or near a destination marker, may acquire the positional indicia on the destination marker using, for example, a camera and image processing circuitry.

In step 415, machine 300, may determine and store the destination marker position and/or angle based on the positional indicia on the marker. Machine 300, or a server, may use circuitry to identify, from the output of the image processing circuitry, the center of the positional indicia on the marker. Machine 300, or the server, may also use circuitry to identify, from the output of the image processing circuitry, the angle of the positional indicia on the marker. The marker position may be stored in the machine and/or server based on the dead reckoning circuitry in machine 300. For example, machine 300 may use odometry to measure the distance traveled from an origin marker to a destination marker and, knowing the position of the origin marker, estimate the position of the destination marker.

In some embodiments, steps 405, 410 and 415 may be repeated to collect additional samples of the marker position data. The repeating of these steps may continue (step 420) until enough samples are collected, which may be determined by the consistency of the collected data.

Figure 5:
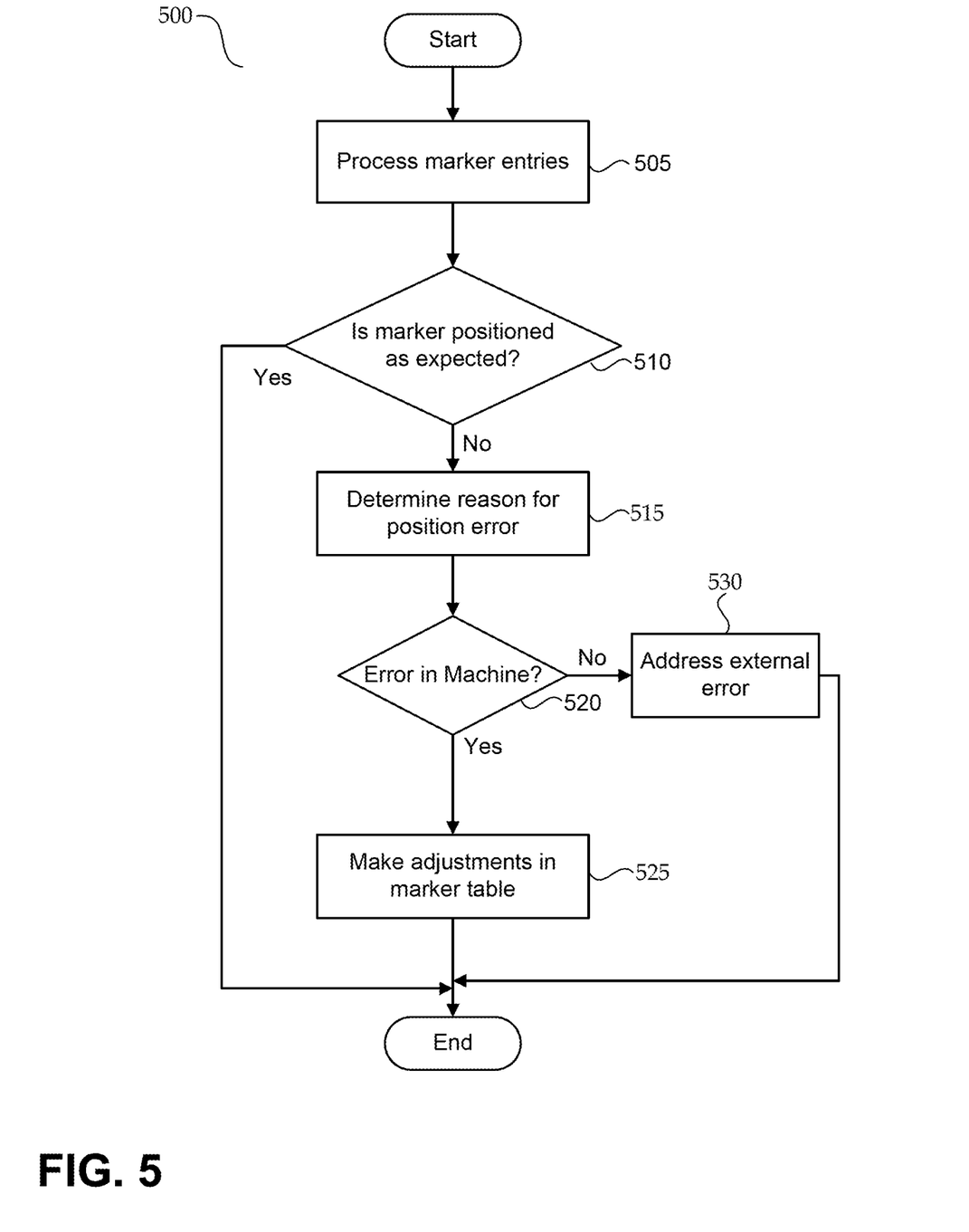
FIG. 5 illustrates a flow diagram representation of another aspect of a method for automated fault diagnosis of machines according to some implementations of the present disclosure.

FIG. 5 illustrates a flow diagram of another aspect of an example automated fault diagnosis process 500 according to some embodiments of the present disclosure. FIG. 5 illustrates the use of processing technique that may allow for the determination of performance levels and faults in a machine. Automated fault diagnosis process 500 may be executed for each entry in the marker offset table at a predetermined frequency.

In step 505, data collected may be processed using statistical techniques to estimate a marker offset. In some embodiments, a mean may be computed of the collected offset entries. In some embodiments outliers (data values beyond one standard deviation from the mean, for example) may be discarded (not used to calculate the mean value).

In step 510, if it is determined that a marker is positioned as expected (consistent with entries in a marker offset table, for example), the process may end. Otherwise, in step 515, a determination of the reason for the position and/or angle error may be made. Machine 300, or the server, may use one or more sets of predetermined criteria to judge the reason for the position and/or angle error. For example, machine 300 or server may determine that if a position offset or angle offset deviation of a single marker exceeds a first predetermined threshold, then the error may be due to a misplacement of the marker. In some embodiments, machine 300 or server may determine that if a position offset or angle offset deviation of all encountered markers exceeds a second predetermined threshold, then the error may be due to a fault in the machine. In other embodiments, a server may assess the errors found in multiple machines, and if all or many machines have found errors in a specific set of markers, then the server may judge that the error is due to one or more misplaced markers.

In step 520, if it is determined that the error is due to the machine, then, in step 525, adjustments may be made in the marker offset table based on the data processed in step 505.

Otherwise, in step 530, an alert may be raised to an external entity (a system operator, through a control console or server, for example) to address the error.

Implementation of the present disclosure for automated fault diagnosis is extremely useful as conventionally, all machines require manual intervention, even if the fault is a low level degradation fault. For instance, a low level degradation fault may be a worn out wheel. A faulty wheel may cause the machine to reach a destination slightly angled, or cause and error in the measurement of distance. The embodiments of the present disclosure seek to identify faults with one of the wheels and may attempt to adjust its rotation automatically to cause it to cover the same distance as the other wheel. It may therefore minimize the extent of manual intervention and thereby, any overhead caused due to the same.

As will be appreciated by one of skill in the art, embodiments of the present disclosure may be embodied as a method, system, or computer program product stored on a non-transitory storage device. Accordingly, embodiments of the present disclosure may take the form of an entirely hardware embodiment, a software embodiment or an embodiment combining software and hardware aspects all generally referred to herein as a "circuit" or "module." Furthermore, embodiments of the present disclosure may take the form of a computer program product on a computer-usable storage medium having computer-usable program code embodied in the medium.

Furthermore, embodiments of the present disclosure were described in part above with reference to flow diagram illustrations and/or block diagrams of methods, apparatus (systems), and computer program products according to embodiments of the present disclosure.

It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

Instructions may also be loaded onto a computer or other programmable data processing apparatus like a scanner/check scanner to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flow diagrams herein illustrate the functionality and operations of some embodiments of methods, systems, and computer program products for automated fault diagnosis. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments. Obviously, numerous modifications and variations of the present disclosure are possible in light of the above teachings. It is therefore to be understood that within the scope of the appended claims, the embodiments may be practiced otherwise than as specifically described herein.

The invention claimed is:

1. A method for diagnosing and recovering from faults in a robot, the method comprising:
providing a plurality of markers affixed to a floor surface, each marker having a positional indicia thereon and each marker having a position and angle;
navigating, by the robot, from a first marker of the plurality of markers to a second marker of the plurality of markers using a stored position offset and/or angle offset of the second marker and a position and angle of the first marker relative to the robot;
acquiring, using a sensor, the positional indicia on the second marker;
processing, using circuitry, the acquired positional indicia to determine a position and angle of the second marker;
computing a position offset and angle offset of the second marker with respect to the position and angle of the first marker;
adjusting the stored position offset and angle offset of the second marker when the computed position offset and angle offset of the second marker meets a first predetermined criteria; and
alerting an external entity when the computed position offset and angle offset of the second marker does not meet the first predetermined criteria.

2. The method of claim 1, further comprising:
altering one or more operating parameters of the robot when the computed position offset and angle offset of the second marker meets a second predetermined criteria.

3. The method of claim 2, wherein the one or more operating parameters of the robot includes a ratio of wheel velocities between a first wheel and a second wheel.

4. The method of claim 1, wherein the positional indicia include one or more of a bar code, a QR code, a Data Matrix code, and an Aztec Code.

5. The method of claim 1, wherein the sensor includes one or more of a camera and a laser scanner.

6. The method of claim 1, wherein the adjusting of the stored position offset and angle offset of the second marker includes using a statistical method.

7. The method of claim 1, wherein the first predetermined criteria includes a first predetermined threshold of the computed position offset and angle offset of the second marker.

8. The method of claim 2, wherein the first predetermined criteria includes a first predetermined threshold of the computed position offset and angle offset of the second marker and the second predetermined criteria includes a second predetermined threshold of the computed position offset and angle offset of the second marker, wherein the second predetermined threshold is greater than the first predetermined threshold.

9. A system for diagnosing and recovering from faults comprising:
a plurality of markers affixed to a floor surface, each marker having a positional indicia thereon and each marker having a reference position and angle;
one or more robots, wherein each robot includes circuitry configured to:
navigate from a first marker of the plurality of markers to a second marker of the plurality of markers using a stored position offset and/or angle offset of the second marker and a position and angle of the first marker relative to the robot;
acquire, using a sensor, the positional indicia on the second marker;
process the acquired positional indicia to determine a position and angle of the second marker;
compute a position offset and angle offset of the second marker with respect to the position and angle of the first marker;
adjust the stored position offset and angle offset of the second marker when the computed position offset and angle offset of the second marker meets a first predetermined criteria; and
alert an external entity when the computed position offset and angle offset of the second marker does not meet the first predetermined criteria.

10. The system of claim 9, wherein the circuitry is further configured to:
alter one or more operating parameters of the robot when the computed position offset and angle offset of the second marker meets a second predetermined criteria.

11. The system of claim 10, wherein the one or more operating parameters of the robot includes a ratio of wheel velocities between a first wheel and a second wheel.

12. The system of claim 9, wherein the positional indicia include one or more of a bar code, a QR code, a Data Matrix code, and an Aztec Code.

13. The system of claim 9, wherein the sensor includes one or more of a camera and a laser scanner.

14. The system of claim 9, wherein the adjustment of the stored position offset and angle offset of the second marker includes using a statistical method.

15. The system of claim 9, wherein the first predetermined criteria includes a first predetermined threshold of the computed position offset and angle offset of the second marker.

16. The system of claim 10, wherein the first predetermined criteria includes a first predetermined threshold of the computed position offset and angle offset and the second predetermined criteria includes a second predetermined threshold of the computed position offset and angle offset, wherein the second predetermined threshold is greater than the first predetermined threshold.

* * * * *